(12) United States Patent
Klausler et al.

(10) Patent No.: US 10,218,538 B1
(45) Date of Patent: Feb. 26, 2019

(54) HYBRID CLOS-MULTIDIMENSIONAL TOPOLOGY FOR DATA CENTER NETWORKS

(71) Applicant: Google LLC, Mountain View, CA (US)

(72) Inventors: Peter Michael Klausler, Mountain View, CA (US); Angela Chen, San Francisco, CA (US); Michael Roger Marty, Madison, WI (US); Philip Michael Wells, Madison, WI (US); Adi Avidor, Bat-Yam (IL)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 14/168,245

(22) Filed: Jan. 30, 2014

(51) Int. Cl.
*H04L 12/64* (2006.01)
*H04L 12/24* (2006.01)

(52) U.S. Cl.
CPC .............. *H04L 12/64* (2013.01); *H04L 41/08* (2013.01)

(58) Field of Classification Search
None
See application file for complete search history.

(56) References Cited

U.S. PATENT DOCUMENTS

| | | | | |
|---|---|---|---|---|
| 8,489,718 B1* | 7/2013 | Brar | ...................... | H04L 49/356 370/254 |
| 8,601,297 B1* | 12/2013 | Abts | ........................ | H04L 69/14 713/300 |
| 8,621,111 B2* | 12/2013 | Marr | .................... | H04L 12/4625 709/250 |
| 9,363,208 B1* | 6/2016 | Judge | ....................... | H04L 49/15 |
| 9,654,852 B2* | 5/2017 | Yin | ..................... | H04Q 11/0062 |
| 9,705,798 B1* | 7/2017 | Abts | ..................... | H04L 47/122 |
| 9,755,900 B2* | 9/2017 | Tenginakai | ........... | H04L 41/082 |
| 2011/0010522 A1* | 1/2011 | Abts | .................. | G06F 15/17375 712/3 |
| 2011/0072237 A1* | 3/2011 | Pechanek | ........................ | 712/11 |
| 2012/0128004 A1* | 5/2012 | Aybay et al. | .................. | 370/401 |
| 2013/0083701 A1* | 4/2013 | Tomic et al. | .................. | 370/255 |
| 2014/0146824 A1* | 5/2014 | Angst et al. | .................. | 370/401 |
| 2015/0076923 A1* | 3/2015 | Frankel et al. | ............... | 307/113 |
| 2015/0181317 A1* | 6/2015 | Yin | .................... | H04Q 11/0062 398/45 |

OTHER PUBLICATIONS

Singla et al. (Jellyfish: Networking Data Centers Randomly, 2012).*
Clos, Charles, "A Study of Non-Blocking Switching Networks", The Bell System Technical Journal, Mar. 1953, pp. 406-424.
Kim et al., "Flattened Butterfly: A Cost-Efficient Topology for High-Radix Networks", ACM SIGARCH Computer Architecture News, vol. 35, No. 2, ACM, 2007.
Mysore, Radhika Niranjan, et al. PortLand: A Scalable Fault-Tolerant Layer 2 Data Center Network Fabric, ACM SIGCOMM Computer Communication Review, vol. 39, No. 4, ACM, Aug. 2009.

* cited by examiner

*Primary Examiner* — Gregory B Sefcheck
(74) *Attorney, Agent, or Firm* — McDermott Will & Emery LLP

(57) ABSTRACT

The expansion of a network by converting the network from a 2-stage folded Clos network to a 3-stage folded Clos network can be cost prohibitive. The system and methods described herein relate to a hybrid network topology. More particularly, the disclosure describes a hybrid topology having internal switches configured in a multidimensional topology configuration. Each of the internal switches are connected to the network hosts with a folded Clos topology.

11 Claims, 4 Drawing Sheets

HYBRID CLOS-MULTIDIMENSIONAL TOPOLOGY FOR DATA CENTER NETWORKS

BACKGROUND OF THE DISCLOSURE

To accommodate the increasing demand for computational power, data center networks are continuing to grow in size. With the advent of high port-count switches, it is possible to scale a data center network to include tens or hundreds of thousands of servers. However, it is becoming cost prohibitive to scale the present network topologies to meet the needs of growing data center networks.

SUMMARY OF THE DISCLOSURE

According to one aspect of the disclosure, a data center network includes an aggregation layer with a plurality of aggregation nodes. Each of the plurality of aggregation nodes include a plurality switches interconnected in a multidimensional topology configuration. The data center network also includes a plurality of nodes in an access layer. Each of the plurality of nodes in the access layer are connected to one of the plurality of switches in at least one of the plurality of aggregation nodes in a folded Clos configuration.

According to another aspect of the disclosure, a method of routing data through a data center network includes providing a plurality of access layer nodes and a plurality of aggregation layer nodes. The access layer nodes are connected to the aggregation layer nodes in a folded Clos network configuration and the aggregation layer nodes each include a plurality of switches coupled together in a multidimensional topology network configuration. The method also includes receiving data at a first of the access layer nodes to be transferred to a second of the access layer nodes, and selecting one of the plurality of nodes in the aggregation layer to forward the received data. The method further includes transferring the data to a first switch in the selected node, and then selecting a second switch in the selected aggregation layer node. The method also includes transferring the data from the first switch to the second switch in the selected aggregation layer node, and transferring the data from the second switch in the selected aggregation node to the second access layer node.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
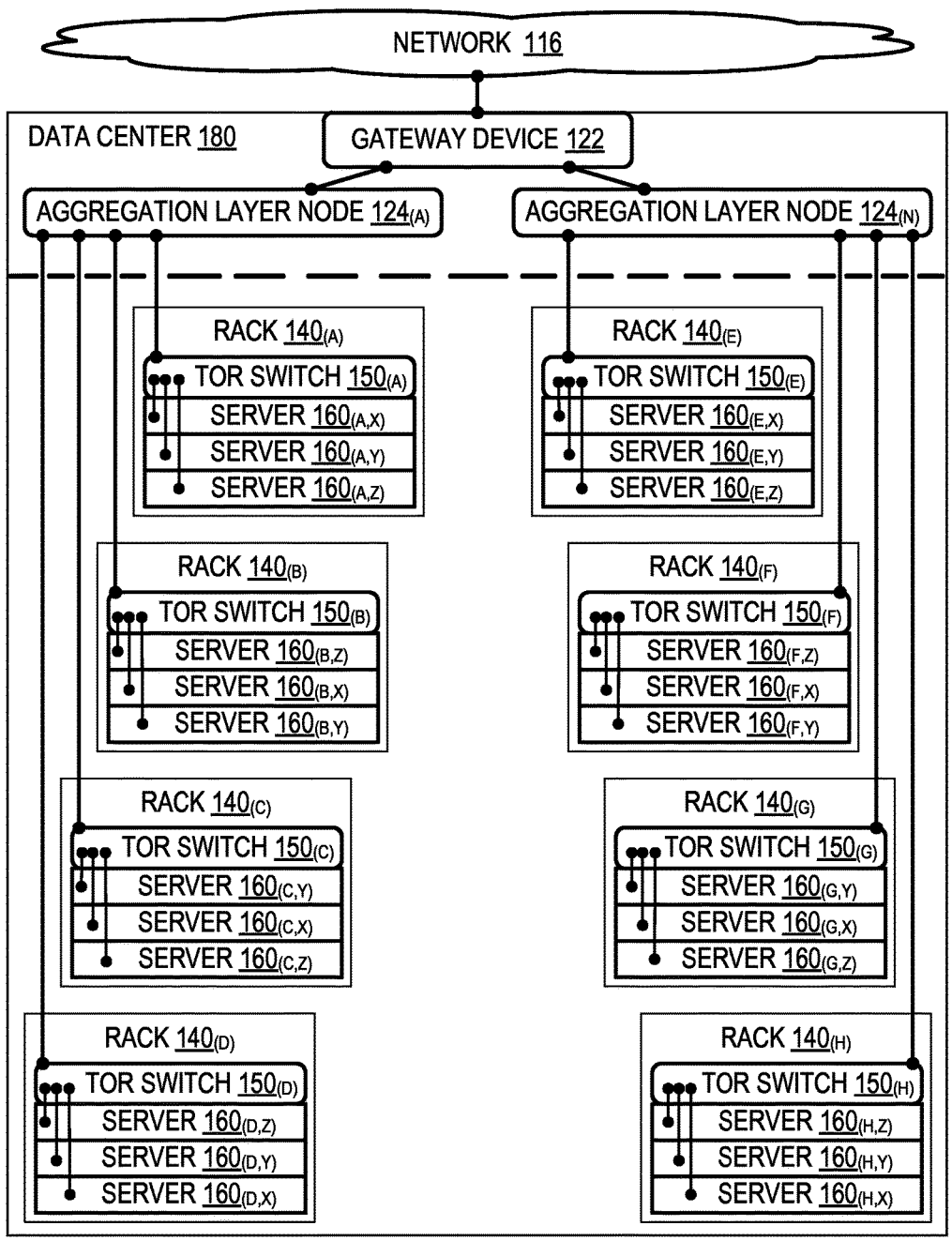
FIG. 1 is a block diagram of an example data center.

FIG. 1 is a block diagram of an example data center. As an overview, the data center 180 houses multiple racks 140(*a-h*), collectively referred to as "racks 140." Each rack 140 groups together, and houses, a plurality of servers 160(*a-h, x-z*), collectively referenced as "servers 160." Each rack 140 also houses at least one top of rack ("ToR") switch 150(*a-h*), collectively referenced as ToR switches 150. Although illustrated as a single group of servers per rack, in practice, a rack 140 may house multiple groups of servers and a ToR switch 150 for each group.

The data center connects the servers 160 to other servers 160 within the data center as well as to other computing device outside the data center over an external network 116. The external data network 116 is a network facilitating interactions between computing devices. An illustrative example external data network 116 is the Internet; however, other networks may be used. The external data network 116 may be composed of multiple connected sub-networks. The external data network 116 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The external data network 116 may be any type and/or form of data network and/or communication network. The external data network 116 may be public, private, or a combination of public and private networks. The external data network 116 is used to convey information between external computing devices and the servers 160 within the data center 180.

One or more gateway devices 122 connect a set of aggregation layer nodes 124 to the external data network 116. A gateway device 122 is a high bandwidth high capacity network device such as a router or a switch. In some implementations, a gateway device 122 connects to a corporate backbone or fiber, such that both sides of the gateway device 122 are under unified control. In some implementations, a gateway device 122 connects to a network service provider network, which may be provided by a third party.

An aggregation layer node 124 includes a switch or router that routes data between the ToR switches 150 and the gateway devices 122. In some implementations, each aggregation layer node 124 includes a plurality of interconnected switches. In general terms, a rack 140, its ToR switch 150, and servers 160 are referred to as an access layer node within an access layer and the collection of aggregation layer nodes 124 is referred to the aggregation layer.

As illustrated in FIG. 1, the ToR switches 150 are connected to a single aggregation layer node 124. In some implementations, the ToR switches 150 and aggregation layer nodes 124 are interconnected in a folded Clos network topology. As a general overview, a folded Clos network is an indirect network topology, where the exterior nodes (i.e., ToR switches 150) are connected to one another through interior nodes (i.e., the aggregation layer nodes 124). The exterior nodes are connected to both hosts (i.e., servers 160) and interior nodes, while interior nodes are connected to only exterior nodes. In a folded Clos network topology each of the exterior nodes are connected to substantially all of the interior nodes. In some implementations of a hybrid network, as described below, each interior nodes of the folded Clos network is a network of interconnected switches.

In some implementations, scaling a folded Clos network requires additional aggregation layers to expand to the size required by large data centers. This expansion can result in excessive oversubscription of the network. Oversubscription occurs when the aggregated host injection rate into a bisection of the network compared to the "bisection bandwidth" is greater than 1. If the ratio is 1 the network is fully provisioned and congestion should not occur in the network for a benign traffic pattern. The bisection of a network is an equal, balanced division of the network. Bisection bandwidth is the aggregated bandwidth of the links between the two divisions of the network. In other words, a network is oversubscribed if the bandwidth between the hosts connected to the division is more than the bandwidth of the connection (or aggregated connections) the division has with the rest of the network. Adding additional aggregation layers can become cost prohibitive because as additional aggregation layers are added, the bisection grows, which results in a larger aggregated host injection rate into the bisection. Accordingly, to have a fully provisioned network, the network links in each additional aggregation layer have greater and greater bandwidth allocations.

Additionally, the maximum scale of folded Clos network with a single aggregation layer and a single access layer is determined by the product of the number of ports on the interior switches of the network. More particularly, the number of hosts that can be connected to the network is $\delta^2/2$, where $\delta$ is the number of ports per switch. Assuming that each ToR 150 and aggregation layer node 124 is a 36 port switch, when connected in a folded Clos topology, the maximum number of servers 160 that could be connected to the network of data center 180 is $3\delta^2/2=648$.

In some implementations, because the bisection bandwidth requirements of adding additional aggregation layers to a folded Clos network is cost prohibitive, some folded Clos networks with a single access layer and single aggregation layer interconnect their aggregation layer nodes 124. In some implementations, interconnecting the aggregation layer nodes 124 results in a topology that resemble a single flattened butterfly topology above the folded Clos network. A flattened butterfly is derived from a butterfly topology. A butterfly topology is described as a k-ary n-fly network, where k-ary indicates the number of hosts connected to each exterior switch and n-fly indicates the number of switches in each dimension of the network topology. In a butterfly topology there exists no route diversity when using minimal-hop routing. In a flattened butterfly topology, each of the switches in a given dimension are combined or "flattened" into a single switch. The total number of switches in the network is $S=k^{n-1}$. If c hosts are connected to each of the switches, then there are cS hosts in the network. Each switch is connected to its nearest neighbor in each dimension (d). More particularly, each switch is connected to the other switches in the flattened butterfly based on the equation:

$$j = i + \left[m - \left(\left\lfloor \frac{i}{k^{d-1}} \right\rfloor \bmod k\right)\right] k^{d-1}$$

where j represents the switch to which switch i is connected. For each i from 0 to S−1, j is calculated with m from 0 to k−1 and d from 1 to n−1. For example, a switch in position 0 of a 2-ary 4-fly flattened butterfly topology is connected to the switches in positions 1, 2, and 4. The network includes a total of 8 switches.

The flattened butterfly topology requires switches with a higher port count than compared to the butterfly topology. The flattened butterfly topology is a direct topology. In a direct topology there are no interior switches like in a folded Clos topology or a butterfly topology (given that the n of n-fly is greater than 2). Instead, each of the switches are connected to both hosts and other switches. Each switch in a flattened butterfly topology is connected to n−1 switches. However, the above described "interconnected" folded Clos networks are susceptible to pathological traffic patterns when data traffic is not evenly distributed among all of the aggregation layer nodes 124.

Figure 2:
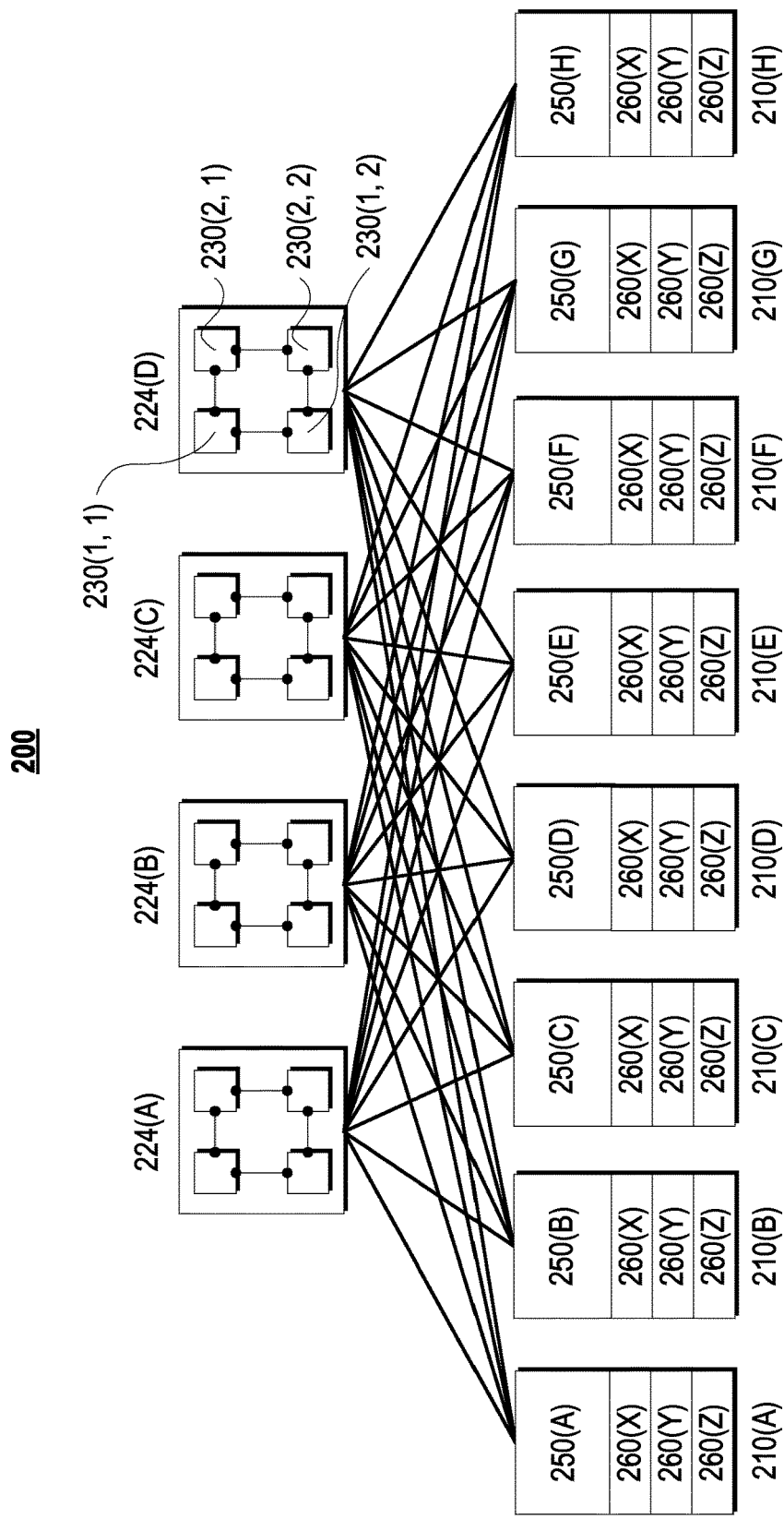
FIG. 2 is a block diagram of an example hybrid topology data center network.

FIG. 2 is a block diagram of an example hybrid topology data center network 200. The hybrid data center network 200 is a folded Clos network between a set of aggregation layer nodes 224(a-d) and a set of access layer nodes 210(a-h). In the hybrid data center network 200, each of the internal nodes (i.e., aggregation layer nodes 224) of the folded Clos network are formed from a group of switches 230 connected according to a flattened butterfly topology. In some implementations, each of the aggregation layer nodes 224 are connected to each of the access layer nodes 210 as part of a folded Clos network topology. As described above in relation to FIG. 1, each access layer node 210 includes a ToR switch 250, which is connected to servers 260(x-z).

Each of the aggregation layer nodes 224 include a plurality of switches 230. The switches 230 within a given aggregation layer node 224 are interconnected in a flattened butterfly topology. As described above, a flattened butterfly is a symmetric, direct network. In the flattened butterfly topology configuration, each of the switches 230 within a given aggregation layer node 224 are connected to other switches 230 within the given aggregation layer node 224 and to a plurality of ToRs 250. Each of the ToRs 250 are connected to one of the switches 230 within a given aggregation layer node 224, forming a folded Clos network between the aggregation layer nodes 224 and the ToRs 250. As described in relation to FIGS. 2 and 3, each switch 230 in a given aggregation node is referenced by a its (row, column) indices, with (1, 1) being in the top, left-hand corner of each aggregation node 224. For example, switch 230(1, 2) is the switch in the top, right-hand corner of each aggregation node 224.

In some implementations, the switches 230 are routers, switching chips, or any other device or arrangement of devices capable of routing information from one port to another. In some implementations, the switches 230 have a downward-facing port for each of the access layer nodes 210 and an inner-switch-facing port for each of the plurality of switches 230 within the switches' aggregation layer node 224 (i.e., the switch's flattened butterfly network). In some implementations, each switch 230 may also include a plurality of open ports that are used for the future expansion of the hybrid data center network 200. In some implementations, the number of downward-facing ports is equal to the number of inter-switch-facing ports. In other implementations, the number of downward-facing ports is greater than or less than the number of inter-switch ports. In some implementations, the switch 230 have a total of 16, 36, 48, 64, 128, or more total ports.

In some implementations, each ToR's connection to an aggregation layer node 224 is made directly to one of the switches 230 in the aggregation node 224. In some implementations, each of the switches 230 within a given aggregation node are connected to the same number of ToRs 250 in the access layer. For example, in the example data center network topology 200, two ToRs 250 may be connected to each of the switches 230 in the aggregation layers nodes 224. In some implementations, when creating the example hybrid network 200, the switch 230 within a given aggregation node 224 to which each ToR 250 is connected is randomly selected.

As discussed above, in some implementations the switches 230 are arranged in a multidimensional topology. In general, a multidimensional topology is a network topology that includes N dimensions. Each dimension j has $K_j$ switches. In some implementations, each of the dimensions have a different value $K_j$. The way the $K_j$ switches within a dimension and the way the N dimensions are interconnected define the type of multidimensional topology. For example, a flattened butterfly network occurs when all N dimensions include the same number of K switches and each dimension j is fully interconnected. In some implementations, the last dimension includes $K_N$ switches, where $K_N$ is an integer divisor n of $K_1$. The last dimension may then have ($K_1/n$) links between each of the $K_N$ switches in the dimension to maintain bandwidth. For example, each dimension of the of an example topology may have 10 switches, with the last dimension having 5 switches. In this example, the switches of the last dimension may have (10/5)=2 links between each of the switches in the last dimension.

In some implementations, the multidimensional topology is a flattened butterfly topology having a radix=2 (binary hypercube), 3, or a higher dimensionality configuration. In some implementations, multidimensional topology is a torus. In FIG. 2, each of the aggregation nodes 224 include a 2 dimensional flattened butterfly network, and as described above, the switches 230 are connected to their nearest neighbors. For example, switch 230(1,1), is connected to switch 230(2, 1) and switch 230(1, 2).

In some implementations, the hybrid folded Clos-flattened butterfly topology can be scaled to include more servers 260 without the same bisection bandwidth requirements as a folded Clos network with a plurality of aggregation layers. This enables the hybrid folded Clos-flattened butterfly topology to be scaled at a reduced cost when compared to the folded Clos network. For example, a 2-stage folded Clos network using 36 port switches can only be scaled to include 648 hosts ($\delta^2/2=36^2/2=648$). Including both the internal and external switches, this example network could only accommodate 54 switches. This equates to an average of 12 hosts per switch. However, a hybrid folded Clos-flattened butterfly topology, using the same 36 port style switches and maintaining the same 12 hosts per switch average, could be scaled to accommodate 1728 switches (($\delta/3)^3=(36/3)^3=1728$). A 32 times increase in the number of switches when compared to a standard folded Clos topology.

The hybrid folded Clos-flattened butterfly topology scales better than a traditional folded Clos network topology, but maintains a number of the benefits seen in the traditional folded Clos network topology. For example, the folded Clos-flattened butterfly topology provides the packaging benefits of a folded Clos network. In a standard flattened butterfly network topology, the switches can be separated by distances within a datacenter that require expensive cabling to interconnect the switches. However, in a hybrid folded Clos-flattened butterfly topology, like in a folded Clos network, the switches within a given aggregation layer node are located in close proximity to one another, enabling the use of inexpensive copper cabling to interconnect the switches. Also, the hybrid folded Clos-flattened butterfly topology, like a flattened butterfly topology uses fewer optical transceivers and fewer switching chips than a comparable folded Clos, and therefore consumes less power.

Figure 3:
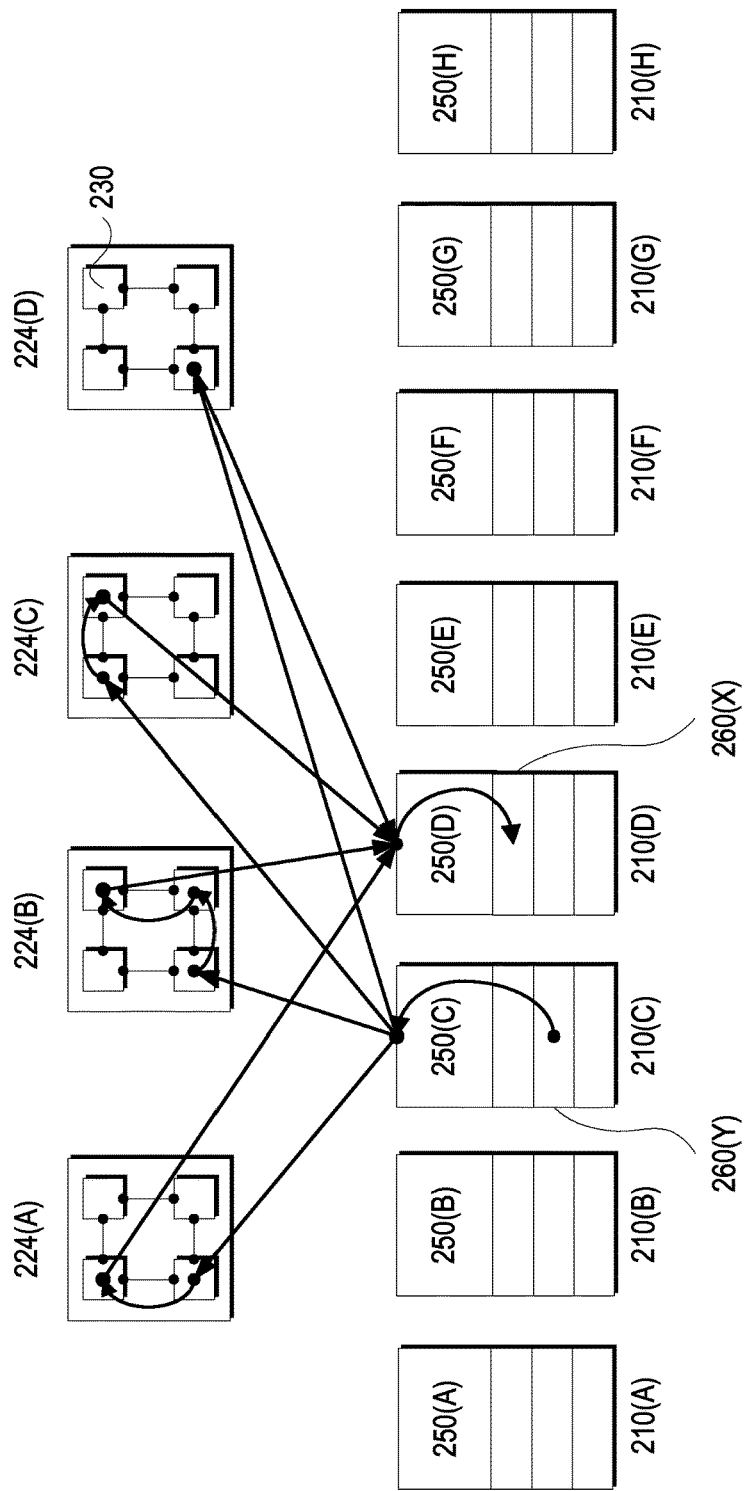
FIG. 3 is a block diagram illustrating a subset of the links in the example data center network of FIG. 2.

FIG. 3 is a block diagram illustrating a subset of the links in the example hybrid data center network 200. FIG. 3 illustrates example paths from the server 260(y) of access layer node 210(c) to server 260(x) of access layer node 210(d). FIG. 3 illustrates, the above mentioned randomized uplinking between the ToRs 250 and the switches 230 of each aggregation node 224. For example, in hybrid data center network 200, ToR 250(c) is connected to switch 230(1, 2), switch 230(1, 2), switch 230(1,1), and switch 230(2,2) in aggregation nodes 224(a-d), respectively, and ToR 250(d) is connected to switch 230(1,1), switch 230(2, 1), switch 230(2, 1), and switch 230(2,2).

The randomized uplinks between each of the ToRs 250 and the switches 230 of each aggregation node 224 reduces the hybrid folded Clos-flattened butterfly topology's susceptibility to pathologically poor traffic patterns. In some implementations, a flattened butterfly topology provides enough minimal bisection bandwidth sufficient to carry uncongested traffic patterns when the traffic patterns are evenly distributed. However, in these implementations, congestion can occur when the traffic patterns are not evenly distributed. By randomizing the uplinks, a first ToR should have a different path through at least one of the aggregation layer nodes 224 to a second ToR. In the hybrid folded Clos-flattened butterfly topology, if one of these paths becomes congested, the traffic between the two ToRs can be routed to use a different path.

For example, and starting with an example where the uplinks are not randomized, assume that ToR 250(a) is sending traffic (large enough to cause congestion) to ToR 250(b) through aggregation layer nodes 224(a-d). Also assume that in each aggregation layer node 224(a-d), ToR 250(a) is connected to switch 230(1, 2) and ToR 250(b) is connected to switch 230(1, 1). Also assume that ToR 250(c) is connected to switch 230(1, 2) and ToR 250(d) is connected to switch 230(1,1) in each of the aggregation nodes 224(a-d). Connecting each ToR 250 to the same relative switch 230 in each of aggregation nodes 224, creates the same relative route through each of the aggregation nodes 224(a-d). In this example, because the routes between ToR 250(a) and ToR 250(b) and the routes between ToR 250(c) and ToR 250(d) share the link between switches 230(1, 2) and 230(1, 1) in each of the aggregation nodes 224(a-d), each possible route ToR 250(c) has to ToR 250(d) is congested with the traffic flowing from ToR 250(a) to ToR 250(b).

FIG. 3 illustrates an example where the uplinks are randomized to create random routes through each of the aggregation nodes 224. In this example, ToR 250(c) is connected to switch 230(1, 2), switch 230(1, 2), switch 230(1,1), and switch 230(2,2) in aggregation nodes 224(a-d), respectively, and ToR 250(d) is connected to switch 230(1,1), switch 230(1, 2), switch 230(1, 2), and switch 230(1,1). As illustrated in FIG. 3, the routes through each of the aggregation nodes 224 are different. Assume that ToR 250(a) is connected to switch 230(1, 2), switch 230(2, 2), switch 230(1,2), and switch 230(1,1) in aggregation nodes 224(a-d), respectively, and ToR 250(b) is connected to switch 230(1,1), switch 230(2, 1), switch 230(2, 1), and switch 230(2,2). In this example, the routes between ToR 250(a) and ToR 250(b) and the routes between ToR 250(c)

and ToR 250(*d*) only share the link between switch 230(1, 2) and switch 230(1, 1) in aggregation nodes 224(*a*). In this example, the traffic between ToR 250(*c*) and ToR 250(*d*) may experience congestion in the route passing through aggregation node 224(*a*); however, the routes passing through aggregation nodes 224(*b-d*) would not experience congestion due to the large amount of traffic flowing from ToR 250(*a*) to ToR 250(*b*).

Figure 4:
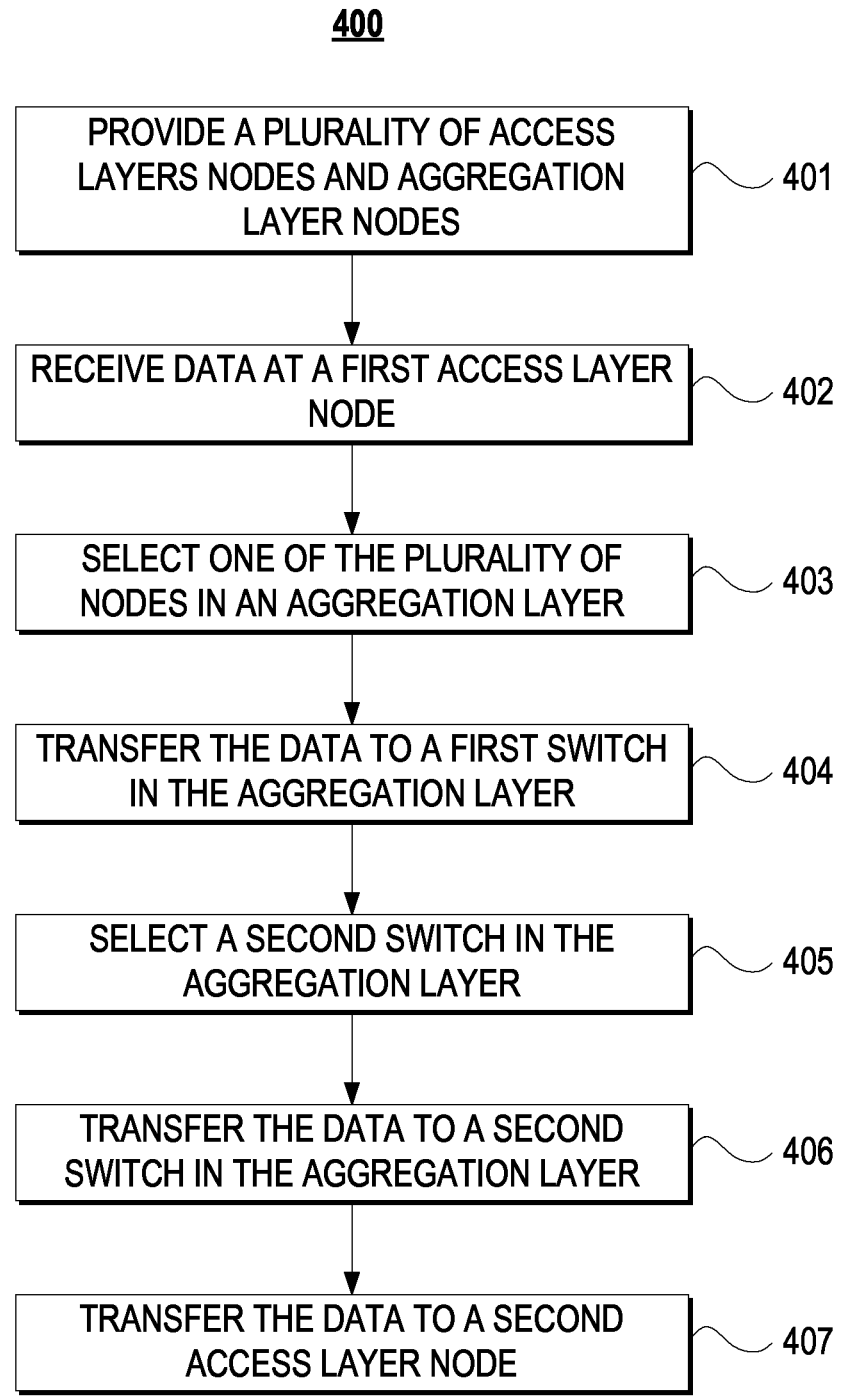
FIG. 4 is a flow chart of an example method for routing data through a data center network.

FIG. 4 is a flow chart of an example method 400 for routing data through a data center network. First, a plurality of access layer nodes and a plurality aggregation layer nodes are provided (step 401). The method includes receiving data at a first access layer node (step 402). Next, one of a plurality of nodes in an aggregation layer is selected (step 403) and the data is transmitted to one of the switches in the selected aggregation layer node (step 404). Then a second switch within the selected aggregation layer node is selected (step 405) and the data is transferred to the second switch (step 406). The data is then transferred to a second access node layer (step 407).

As set forth above, the method 400 includes providing a plurality of access layer nodes and a plurality of aggregation layer nodes (step 401). As described above in relation to FIG. 2, the access layer nodes are connected to the aggregation layer nodes in a folded Clos network topology and the aggregation layer nodes each include a plurality of switches coupled together in a flattened butterfly network topology. The method 400 also includes receiving data at a first access layer node (step 402). As illustrated in FIG. 3, data may be received at the ToR 250(*c*) from the server 260(*x*). The data has an intended destination (i.e., the second access layer node 210(*d*)).

Next, one of the plurality of aggregation layer nodes is selected (step 403). As described above, and illustrated in FIG. 3, the ToR 250(*c*) is connected to each of the aggregation layer nodes 224 as part of a folded Clos network topology. Each of the aggregation layer nodes includes a plurality of switches arranged in a flattened butterfly topology. In some implementations, the aggregation layer node 224 is selected using a hashing function. In some implementations, the aggregation layer node 224 is selected using adaptive routing. In some implementations, an adaptive routing function selects an aggregation layer node 224 to route the packet to responsive to the congestion conditions within each of the aggregation layer nodes 224. In some implementations, information about the above described random uplinking from the access layer to the aggregation layer is used in the selection of which aggregation layer node 224 to send the data. For example, an aggregation layer node 224 that avoids a pathologically poor route may be avoided. In other implementations, a path that reduces the total number of hops that is required to reach the eventual destination may be selected. In some implementations, the path includes a single hop and in other implementations the path includes multiple hops. In other implementations, multipath routing is used to route data, and the data may be transferred to a plurality of aggregation layer nodes 224.

Once an aggregation layer node is selected, the data is transferred to the selected aggregation layer node 224 (step 404). The transferred data is received by the switch 230 within the selected aggregation layer node 224 to which the ToR 250 is connected.

Once the data is in the aggregation layer, a second switch within the aggregation layer is selected. The second switch is the switch to which the destination node (i.e., second access layer node) is connected. For example, and referring to FIG. 3, if the aggregation layer node 224(*c*) was selected (and thus switch 230(1,1) as the first switch) switch 230(2, 1) is selected as the second switch since it is connected to the destination node 210(*d*). In some implementations, the first and second access layer nodes 210 are both connected to the same switch of a given aggregation layer node, such that the data is not transferred to a second switch before being transferred to the second access layer node. This is illustrated by aggregation layer node 224(*d*), where switch 230(1, 2) is connected to both access layer nodes 210(*c*) and (*d*). In some implementations, adaptive routing is used to determine a path between the first and second switch. Once the second switch is selected (and a path to the second switch) the data is transferred to the second switch (step 406) where it is then forwarded to the destination access layer node (step 407). In implementations with multiple hop paths, the data is forwarded to one or more switches 230 and/or aggregation layer nodes 224 before being transmitted to the destination access layer node.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A data center network comprising:
    an aggregation layer including a plurality of aggregation nodes, each of the plurality of aggregation nodes including a plurality of switches interconnected in a flattened butterfly topology network configuration, wherein:
        each of the plurality of switches in each of the plurality of aggregation layer nodes are only connected to the switches in the aggregation layer node that are its nearest neighbor in each dimension of the flattened butterfly topology network configuration;
    a plurality of nodes in an access layer; and
    a plurality of uplinks connecting each of the plurality of nodes in the access layer to one of the plurality of switches in substantially all of the plurality of aggregation layer nodes in a folded Clos network configuration, wherein:
        assignment of uplinks between the plurality of switches in the aggregation layer and the plurality of nodes in the access layer is substantially random, and wherein the data center network is configured to:
        receive data at a first of the access layer nodes to be transferred to a second of the access layer nodes;
        transfer the data to a first switch in a selected aggregation layer node;
        transfer the data to a second switch in the selected aggregation layer node; and
        transfer the data from the second switch in the selected aggregation node to the second access layer node.

2. The data center network of claim 1, wherein the flattened butterfly topology has a hypercube geometry.

3. The data center network of claim 1, wherein one or more dimensions of the flattened butterfly topology is a torus.

4. The data center network of claim 1, wherein one or more dimensions of the flattened butterfly topology includes at least two switches interconnected by a plurality of links.

5. The data center network of claim 1, wherein one or more dimensions of the flattened butterfly topology are only connected to the dimensions that are its nearest neighbors.

6. The data center network of claim 1, wherein each of the connections between each of the plurality of switches in a given aggregation node are oversubscribed.

7. A method of routing data through a data center network, the method comprising:
    providing an aggregation layer including a plurality of aggregation layer nodes, each of the plurality of aggregation nodes including a plurality of switches interconnected in a flattened butterfly topology network configuration, wherein:
        each of the plurality of switches in each of the plurality of aggregation layer nodes are only connected to the switches in the aggregation layer node that are its nearest neighbor in each dimension of the flattened butterfly topology network configuration;
    providing a plurality of nodes in an access layer;
    providing a plurality of uplinks connecting each of the plurality of nodes in the access layer to one of the plurality of switches in substantially all of the plurality of aggregation layer nodes in a folded Clos network configuration, wherein:
        assignment of uplinks between the plurality of switches in the aggregation layer and the plurality of access layer nodes is substantially random;
    receiving data at a first of the access layer nodes to be transferred to a second of the access layer nodes;
    selecting one of the plurality of aggregation layer nodes to forward the received data;

transferring the data to a first switch in the selected aggregation layer node;

selecting a second switch in the selected aggregation layer node;

transferring the data to the second switch in the selected aggregation layer node; and transferring the data from the second switch in the selected aggregation node to the second access layer node.

8. The method of claim 7, wherein the flattened butterfly topology has a hypercube geometry.

9. The method of claim 7, wherein one or more dimensions of the flattened butterfly topology is a torus.

10. The method of claim 7, wherein one or more dimensions of the flattened butterfly topology includes at least two switches interconnected by a plurality of links.

11. The method of 7, wherein transferring the data to the second switch in the selected aggregation layer node further comprises transferring the data through a third switch in the selected aggregation layer node.

\* \* \* \* \*